Figure 1:
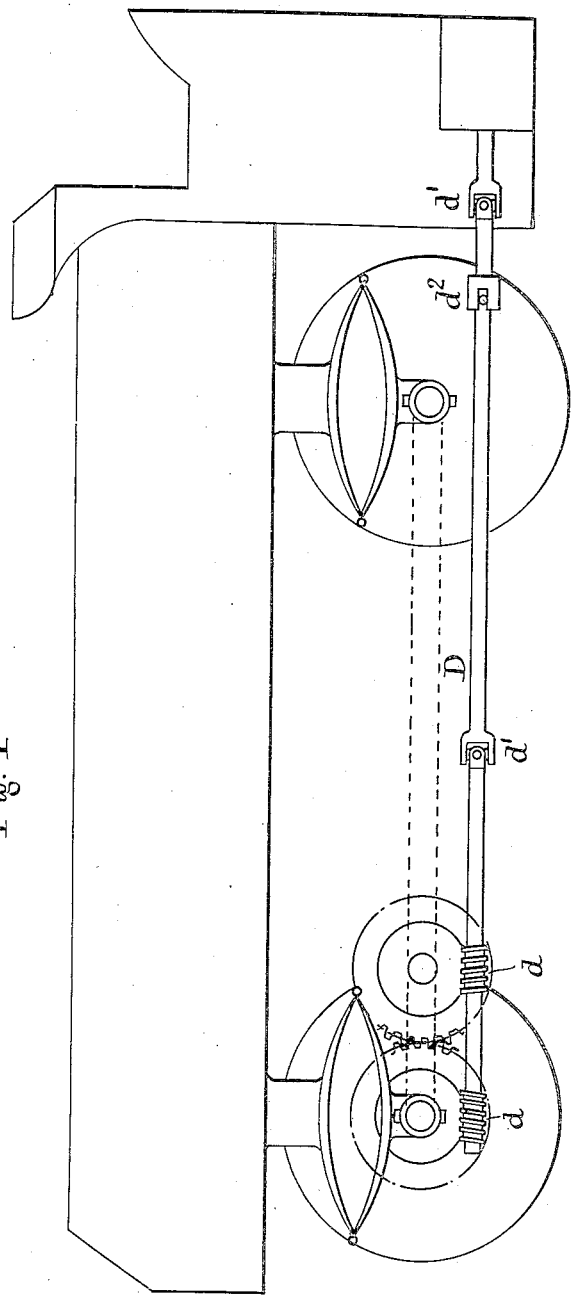

H. W. LEONARD.
ELECTRICALLY PROPELLED VEHICLE.
APPLICATION FILED APR. 13, 1908.

1,121,381.

Patented Dec. 15, 1914.

3 SHEETS—SHEET 1.

H. W. LEONARD.
ELECTRICALLY PROPELLED VEHICLE.
APPLICATION FILED APR. 13, 1908.
1,121,381.
Patented Dec. 15, 1914.
3 SHEETS—SHEET 2.
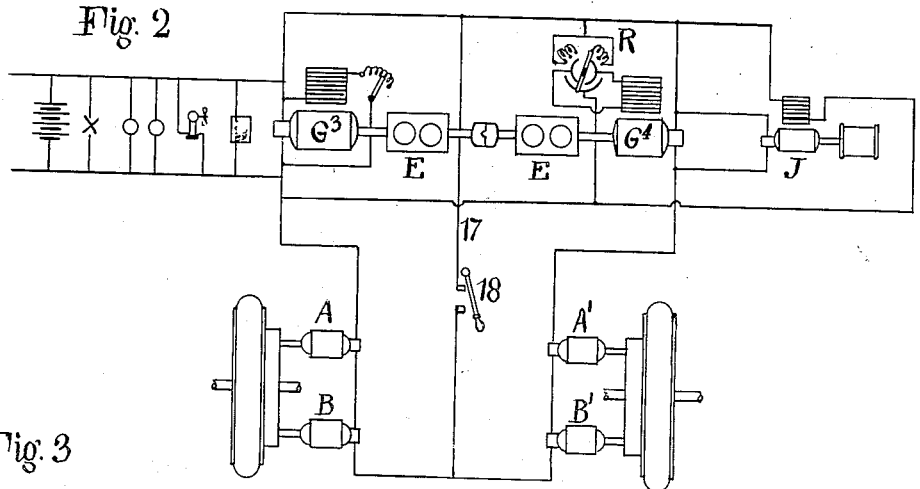
Fig. 2
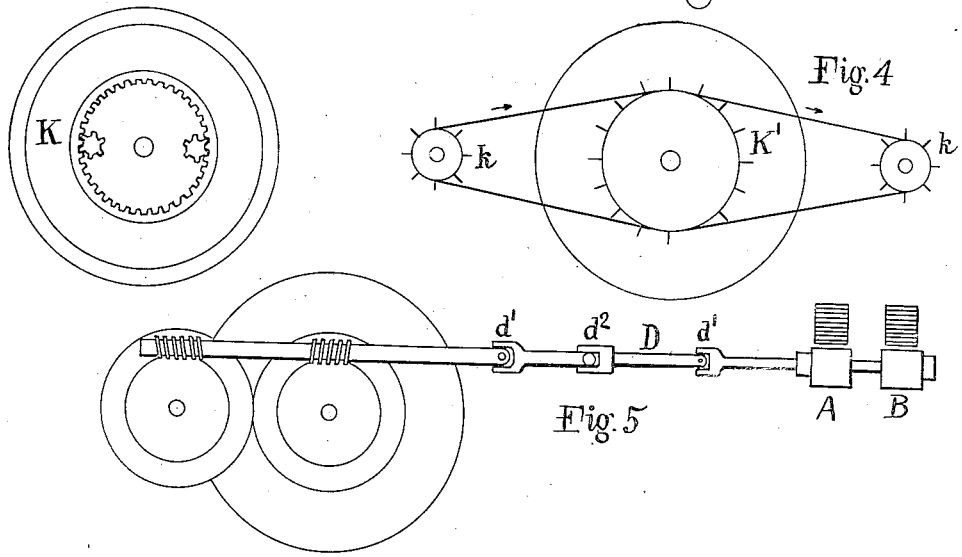
Fig. 3
Fig. 4
Fig. 5
Fig. 6
Witnesses
Geo. C. Hoffman.
Geo. N. Kerr.
H. Ward Leonard, Inventor
By his Attorneys
Edwards, Sager & Wooster.

H. W. LEONARD.
ELECTRICALLY PROPELLED VEHICLE.
APPLICATION FILED APR. 13, 1908.

1,121,381.

Patented Dec. 15, 1914.
3 SHEETS—SHEET 3.

Witnesses
Geo. A. Hoffman
Geo. N. Kerr

H. Ward Leonard, Inventor
By his Attorneys
Edwards, Sager & Wooster

UNITED STATES PATENT OFFICE.

HARRY WARD LEONARD, OF BRONXVILLE, NEW YORK.

ELECTRICALLY-PROPELLED VEHICLE.

1,121,381.   Specification of Letters Patent.   Patented Dec. 15, 1914.

Original application filed March 2, 1903, Serial No. 145,686. Divided and this application filed April 13, 1908. Serial No. 426,840.

*To all whom it may concern:*

Be it known that I, HARRY WARD LEONARD, a citizen of the United States, residing at Bronxville, in the county of Westchester and State of New York, have invented certain new and useful Improvements in Electrically-Propelled Vehicles, of which the following is a full, clear, and exact specification.

This application is a division of my pending application Serial No. 145,686, filed March 2, 1903.

My invention relates to various devices and more especially to that class of vehicles in which an engine is employed for driving a dynamo electric machine which supplies energy to one or more propelling electric motors.

The principal object of my invention when applied to vehicles is to secure more perfect control of the speed and tractive effort over the wide range desirable in order to secure the best results in practice.

Further objects of my invention are the reduction of wear, breakage, noise, strain and shock present in apparatus of this general character as heretofore proposed; the utilization of the simplest, cheapest and best form of prime mover under conditions most favorable for its use; and the use of electric motors for propelling the vehicle under conditions most favorable to their efficiency and durability.

The principal features of my invention when applied to vehicles may be briefly stated as follows: I develop upon the vehicle itself by means of a prime mover, such as a gasolene engine, power employed in the propulsion of the vehicle, and this power is transformed into electric energy, the electromotive force of which is controllable over a wide range at the will of the operator. This electric energy is supplied to one or more propelling motors at such a voltage and current as will cause the vehicle to travel at the speed desired according to the road surfaces and grades met with. In practice the electrical transmission as I employ it replaces the usual mechanical variable or change speed gear, although in some instances I may employ such a gear in addition to the electrical control or electrical transmission gear as it may be termed.

Certain forms of my invention are illustrated in the accompanying drawings, in which—

Figure 7:
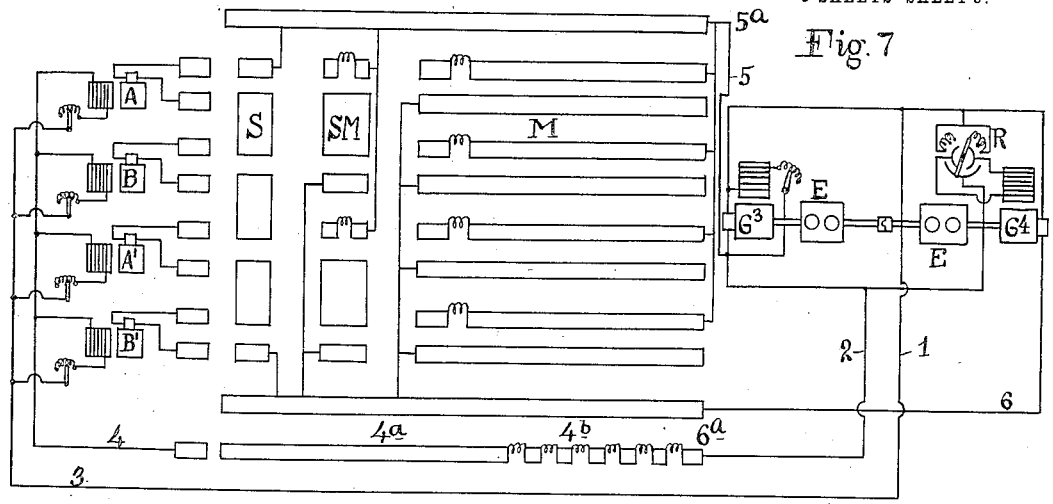
Figure 8:
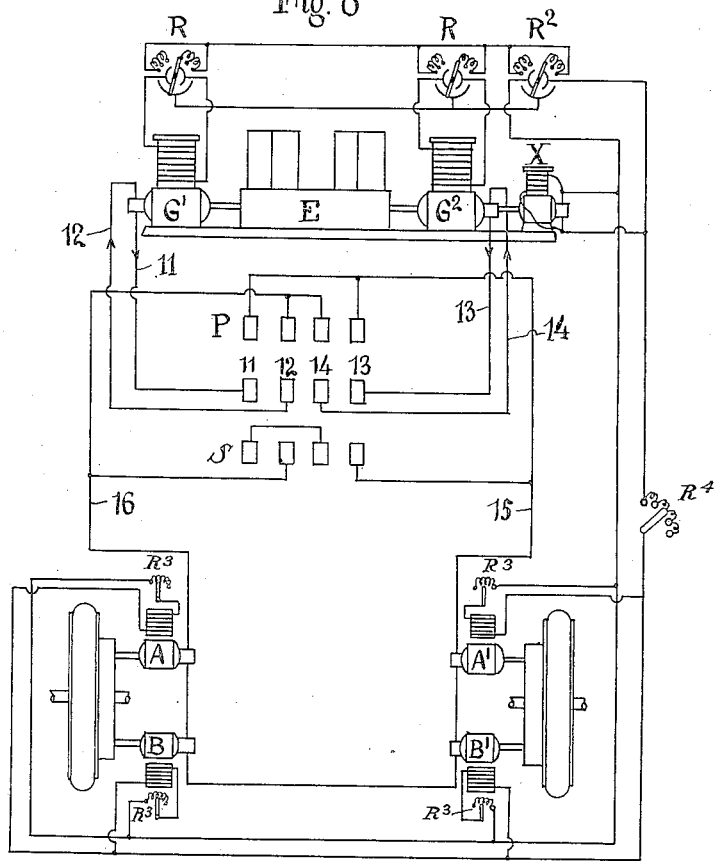

Figure 1 is a diagrammatic illustration of a motor truck in which both generating and propelling apparatus are located in the front of the truck; the propelling motors being connected with longitudinal shafts which are connected through worm gears with reduction gears on the driven shafts; Fig. 2 is a diagram illustrating an embodiment of certain features of my invention, the arrangement of the driving wheels being a modification of that illustrated in Fig. 1; Figs. 3, 4, 5 and 6 are detail views illustrating driving connections which may be employed; Fig. 7 is a diagram illustrating another form of my invention; and Fig. 8 is a diagram of still another form of my invention.

In Fig. 1, I have illustrated a driving connection for a truck having the engine, generator and propelling motors located at the front of the truck where such apparatus will be spring supported relative to the axles. The driving shaft D is provided with a double worm $d$ engaging worm wheels attached to the driving gears connected with the rear axle. This double worm drive is employed so as to balance end thrust. Shaft D is also provided with two Cardan joints $d'$ and an endwise sliding sleeve $d^2$, which joints and sleeve impart flexibility to the shaft. It will be understood that two such shafts D will be employed on each side of the vehicle, one for each propelling motor. It will be noted that the weight of the wheel and the parts moving inflexibly with it is reduced to a minimum by this arrangement, the importance of which is well known. The forward wheels are preferably provided with vertical pivots for steering.

In Fig. 2, I have shown two double cylinder engines E, E of the internal combustion type having their shafts connected by a clutch, and it will be understood that the apparatus shown in Fig. 2 will be carried by the vehicle. Mounted upon the shafts of the gas engines are two dynamo electric generating machines $G^3$, $G^4$ which are driven by the engines and supply electric energy to the propelling motors. The field winding of machine $G^3$ is connected across its armature terminals and is adjustable by means of a rheostat for varying the field strength of the machine. The field winding of machine G⁴ is also connected across the armature terminals of machine G³, but through a reversing rheostat R. Across the armature terminals of machine G⁴ I have connected the armature of a motor J which will operate a hoist or crane. The field of this motor is also connected across the armature terminals of machine G³ and the supply of energy to the armature of motor J is controlled by manipulating the reversing rheostat R to vary the energy developed by machine G⁴. It will be understood that the energy supplied to the armatures of the working motors through the agency of machines G³ and G⁴ can be varied at will from zero to the combined electromotive force of both machines by adjusting the field of machine G⁴, so that its electromotive force will either oppose or assist the electromotive force of machine G³ by means of rheostat R. This arrangement in itself would give a very wide range of speed for the propelling motors, the armatures of which are shown connected in series with the armatures of machines G³ and G⁴, which latter armatures are shown connected in series with each other and with the motor armatures. From the shunt machine G³ may be supplied energy for an electric heater, a fan motor, incandescent or arc lamps, storage battery or other apparatus. The four motors A, B, A′ and B′, although illustrated as connected in series, it will be understood that they may be connected in parallel and may be controlled by a series parallel controller for the purpose of still further varying the range of torque and speed of the vehicle. I have also shown a normally open circuit 17 and a switch 18 whereby in case of a break-down of one of the engines E, or of one of the generators or motors, said circuit 17 may be closed and the other half of the system continued in operation which imparts greater reliability to the system. It will be understood that if machine G³ breaks down, machine G⁴ should have its field circuit connected in shunt across its armature.

In Fig. 2, I have also illustrated the propelling motors as operating in pairs upon a traction wheel, thus motor A, B drive one traction wheel, and motors A′, B′ drive the other traction wheel. The driving connection is illustrated in Fig. 3, in which the traction wheel is provided with an internally toothed gear wheel K with which the pinions on the armature shaft engage at diametrically opposite points so as to drive the wheel with the least strain and friction on the central bearing on which the hub of the wheel turns. A modification of this driving connection is illustrated in Fig. 4 in which the traction wheel is provided with a double sprocket wheel K′ driven by two sprocket chains from small sprocket wheels $k$ on the armature shaft of the motors. The pull of the two chains is applied at opposite ends of the diameter through the axis of the wheel hub so as to make a balanced driving couple which gives best results when very heavy efforts have to be transmitted to the driving wheels.

In Fig. 5, I have shown the driving connection of Fig. 1, the shaft in this case being driven by two motors A, B. A modification of the arrangement shown in Fig. 5 is shown in Fig. 6, wherein two driving shafts are employed, and one motor for each shaft, the double balanced worms being so arranged that their effort is at opposite ends of the same diameter.

In Fig. 7, I have illustrated a form of series parallel controller similar to that shown in Fig. 3 of my original application for securing series parallel connection of the four motors of Fig. 2, the machines for supplying energy to the motors being of the form shown in Fig. 2. The field windings of the motors are connected in multiple arc relation across circuit 3, 4 with a resistance in series with each winding for the purpose of adjusting the fields relatively to each other. Circuit 3, 4, is connected across circuit 1, 2 extending from the armature terminals of generator G³, conductor 4 being attached to a stationary contact adapted to make contact with plates 4ª and 4ᵇ which are connected with conductor 2. The armature circuit 5, 6 from machines G³, G⁴ is connected with brushes or other suitable contacts engaging plates 5ª and 6ª, and between these plates are connected a series of moving contacts, M, SM and S, with which the stationary contacts to which the armature windings of the motors are connected, make contact. With the three sets of contacts arranged as shown, the four armature windings will be connected in multiple arc relation when the stationary contacts are on plates M; when on plates SM two armature windings will be in series, and the other two armature windings will be in series, the two series being connected across the line in multiple arc relation; and when the stationary contacts are on the plates S the four armature windings will be in series across the line. In this diagram I have shown the intermediate steps supplied with resistances so as to pass smoothly from one arrangement of the armature windings to the next. The arrangement of windings and connections illustrated gives three torques with the ratios of one, two and four, with a certain number of amperes supplied to the motor circuit and constant motor fields. When the windings of the motor armatures are all in multiple the motor fields may be weakened by resistances 4ᵇ to obtain a still further range of speed. The electromotive force of the circuit supplying the motors can be varied from zero to the combined electromotive forces of machines $G^3$, $G^4$ as above explained to vary the energy supplied to the armatures of the propelling motors, and the fields of the propelling motors can also be varied so as to secure the widest possible range in speed and torque. It will be understood that the speed of the vehicle is gradually increased by movement of the controlling switch shown in Fig. 7 to the left, giving first the full series connection of the armature winding, then series multiple connections, then the full multiple connections of the motor armature windings and then further increase in speed by weakening the fields of the motors by the insertion of resistances $4^b$ in the field circuit of the motor field windings, and that a gradual decrease in speed is obtained by the reverse movement of the controlling switch.

In Fig. 8, I have illustrated a modification of the system of Fig. 2, but have not carried out the various connections for the armatures of the propelling motors, it being understood however, that the armatures may be connected up in the same or similar successive steps for securing series parallel control of the motors by means of a controller of the form illustrated in Fig. 7. In Fig. 8, E represents a four cylinder gasolene engine and $G'$ and $G^2$ dynamo electric machines driven by said engine, and X an exciter also driven by said engine. The field windings of the two machines $G'$ and $G^2$ are connected in parallel across the armature terminals of exciter X, through a reversing rheostat $R^2$, a reversing rheostat R being connected in each field circuit. The reversing rheostat $R^2$ affords means for similarly and simultaneously adjusting and reversing the fields of machines $G'$, $G^2$. The field windings of the motors A, B, A' and B' are connected in parallel across the armature terminals of exciter X. The energy supplied to the armatures of the propelling motors can be varied from zero to maximum in either direction by adjusting the reversing rheostats R relatively to each other. A rheostat is inserted in the field circuit of each motor as indicated in the drawing at $R^3$ for adjusting the fields relatively to each other, and another rheostat as indicated at $R^4$ is connected in the circuit leading to those fields from exciter X for the purpose of regulating all the motor fields simultaneously and similarly. I have shown a series parallel switch SP in the armature circuits of $G'$ and $G^2$, whereby the armatures of the said machines may be connected in series or in parallel to supply energy to the armatures of the working motors. The armature circuit 11, and 12 of machine $G'$ is connected to movable switch blades 11, 12 and the armature circuit 13, 14 of machine $G^2$ is connected to movable switch blades 13, 14. The armature circuit 15, 16 for the working motors is connected in two branches with stationary contacts SP. It will be observed that when the movable contacts are brought into engagement with stationary contacts S, the circuit connections will be as follows: from armature $G'$ by conductor 11 to the first contact S, from that contact to the third contact S, to movable contact 14 and conductor 14 to the armature of machine $G^2$ and from that armature by conductor 13 to movable contact 13 and the fourth stationary contact S and from that contact to conductor 15 to the armatures of the working motors and from the working motors by conductor 16 to the second stationary contact S and from that contact by movable contact 12 and conductor 12 back to the armature of machine $G'$. When the movable switch blades are moved into contact with stationary contacts P the two armatures will act in parallel; the circuit from machine $G'$ being by the way of conductor 11, blade 11, first contact P and conductor 15 to the motor armatures and from the motor armatures by conductor 16 to the second stationary contact P and by blade 12 and conductor 12 back to the armature of machine $G'$; the circuit from the armature of machine $G^2$ will be by conductor and blade 13 to the fourth stationary contact P and by conductor 15 to the motor armatures and from the motor armatures by conductor 16 to the third stationary contact P and by blade and conductor 14 back to the armature $G^2$.

In the arrangement of Fig. 8 it will, as above referred to, be observed that by manipulating the reversing field rheostats of machines $G'$ and $G^2$, there can be obtained from those machines an electromotive force which will vary from zero to the combined electromotive forces of both machines and in either sense. The reversing rheostat $R^2$ may be employed when the armatures of machines $G'$ and $G^2$ are connected in multiple or in series so that when varying the energy supplied by those machines, by varying their fields simultaneously and to the same extent, they will divide equally the total load.

With the arrangement of Fig. 8 applied to a truck and when working on heaviest duty, as for instance on the worst grades met with, the armatures of machines $G'$ and $G^2$ will be connected in multiple and the armatures of the four propelling motors will be connected in series. For obtaining the maximum speed on a level, the armatures of machines $G'$ $G^2$ will be connected in series and the armatures of the four propelling motors will be connected in multiple. The relative values of these connections will be as follows, assuming that the energy developed in each of the machines G' and G² is 100 volts and 50 amperes, and assuming also that the capacity of each of the working motors with full fields is 200 volts and 100 amperes: For maximum torque we will have a torque due to 100 amperes×4=400 and the speed would be that due to $$\frac{100 \text{ volts}}{4} = 25.$$

For maximum speed on a level we will have a speed due to 200 volts on each motor armature, and hence the speed will be 8 times as much as in the first instance and the torque will be that due to 50 amperes, that is, the torque will be ⅛ of the maximum torque. By weakening the fields of the propelling motors the speed can be still further increased 25% or more with a corresponding reduction of torque for the same amperes. In many instances a truck provided with two generators and two motors with one exciter will give sufficiently good results. Such a combination will give for heaviest grades a maximum torque (generators in multiple) due to 50 amperes+50 amperes=100 A.×2 motors in series=200 and a corresponding speed due to two motors in series 100 volts= 50. This combination on a level will give a maximum speed (without varying motor fields) due to 100 volts+100 volts=200 and a corresponding torque due to $$\frac{50 \text{ amperes}}{2}$$

in each armature, and two armatures in multiple gives a torque due to 50 amperes. This last arrangement will give an electrical gear having a reduction of 4 to 1 and by weakening the motor fields the reduction can be made 5 to 1 or 6 to 1. With the arrangement illustrated in Fig. 8 we can obtain a reduction of 8 to 1 without varying the motor fields and by motor field regulation we can obtain an electrical gearing having a reduction variable from 1 to 10 with a speed variable from 10 to 1.

It will be seen that if the electromotive force of the generator, or generators supplying energy to the circuit, is lower than that of the opposing electromotive forces in the circuit, as may be the case in going down grades or in retarding the machine, the armature of the generator will be driven as a motor and act to retard or limit the speed of the vehicle to any desired amount. I may therefore cause the vehicle to be retarded by lowering the electromotive force of the generator by weakening its field as by means of the rheostat; the motors will then act as generators and supply energy to the generator which now acts as a motor. Since the vehicle when going down grade can be reversed and caused to back up the grade, it will be apparent that by placing the controlling rheostat at a proper position, a current can be passed from the generator through the motors which will tend to move the vehicle backward up the grade but will be just sufficient to balance the tendency of the vehicle to move down the grade by virtue of its weight. My invention therefore affords a simple arrangement for holding the vehicle stationary when either going up a grade or going down a grade and without the necessity of using brakes.

While I have shown separate dynamo electric generators and dynamo electric motors as the means for transmitting electrically the energy of the prime mover to the wheels, it will be understood that my invention is not limited to such means but may cover any suitable means for electrically transmitting the power of the prime mover to the driven device or devices.

While I have shown and described certain forms of my invention, it will be understood that the scope of my invention is not confined thereto, and that I am limited only as indicated in the following claims.

Having thus described my invention, I declare that what I claim as new and desire to secure by Letters Patent is,—

1. The combination of a source of electromotive force, two electric motors supplied with energy from said source, the armatures of said motors being connected in series with each other, means for separately exciting a field winding of each of said motors, a common driven element, driving means between each of said motors and said driven element for driving said element at a plurality of points of application, and means for varying the electromotive force of said source and for causing said motors to act as generators for electro-dynamically braking said element.

2. The combination in a vehicle of two tractive wheels adapted to be operated at different relative speeds, gearing mechanism acting upon said wheels to apply a driving effort at a plurality of points of application, an electric motor in driving relation to the gearing mechanism of each wheel respectively, a dynamic source of electric energy for supplying at least one winding of each of said motors, and means for varying the electromotive force of said source and for causing said motors to act as generators for electro-dynamically braking the vehicle.

3. In an electrically propelled vehicle, two independently movable tractive wheels, gearing mechanism for applying a driving effort in two divisions to each of said wheels, two driving electric motors for each of said wheels, and means for connecting the armatures of the two motors of each wheel in series.

4. In an electrically propelled vehicle, two independently movable tractive wheels, gearing mechanism for applying a driving effort to each of said wheels in two approximately equal divisions, two driving electric motors for said wheels respectively, a separately excited generator for supplying energy to said motors, an internal combustion engine for supplying power to said generator, and controlling means whereby the generator may be caused to supply to the motors a current for holding the vehicle stationary upon a grade.

5. In an electrically propelled vehicle, two independently movable tractive wheels, gearing mechanism for applying a driving effort to each of said wheels in two approximately equal divisions, two driving electric motors, a separately excited generator for supplying energy to said motors, an internal combustion engine for supplying power to said generator, and controlling means whereby a current may be caused to flow through the motor armatures for braking purposes.

In testimony whereof I affix my signature, in presence of two witnesses.

HARRY WARD LEONARD.

Witnesses:
B. E. SMYTHE,
GEO. N. KERR.